(12) United States Patent
Canady et al.

(10) Patent No.: US 10,136,628 B1
(45) Date of Patent: Nov. 27, 2018

(54) FISHING LURE CONTAINMENT AND STORAGE APPARATUS

(71) Applicants: Terry Bruce Canady, Skiatook, OK (US); Seth Jacob Canady, Skiatook, OK (US); Leroy Elmer Chanley, Skiatook, OK (US)

(72) Inventors: Terry Bruce Canady, Skiatook, OK (US); Seth Jacob Canady, Skiatook, OK (US); Leroy Elmer Chanley, Skiatook, OK (US)

( * ) Notice: Subject to any disclaimer, the term of this patent is extended or adjusted under 35 U.S.C. 154(b) by 0 days.

(21) Appl. No.: 15/494,831

(22) Filed: Apr. 24, 2017

Related U.S. Application Data

(63) Continuation-in-part of application No. 14/877,120, filed on Oct. 7, 2015.

(60) Provisional application No. 62/178,911, filed on Apr. 22, 2015.

(51) Int. Cl.
*A01K 97/06* (2006.01)

(52) U.S. Cl.
CPC .................... *A01K 97/06* (2013.01)

(58) Field of Classification Search
CPC ................ A01K 97/06; A01K 97/04
See application file for complete search history.

(56) References Cited

U.S. PATENT DOCUMENTS

| | | |
|---|---|---|
| 2,095,048 A | 10/1937 | Aikins |
| 3,389,491 A | 6/1968 | Lowrey |
| 3,905,145 A | 9/1975 | Cunningham |
| 4,179,834 A | 12/1979 | Thomas |
| 4,947,577 A | 8/1990 | Abbotoy |
| 4,977,700 A | 12/1990 | Perlman et al. |
| 5,533,297 A | 7/1996 | Crosby |
| 5,934,464 A | 8/1999 | Vargo et al. |
| 6,023,876 A | 2/2000 | Haddad et al. |
| 6,256,925 B1 | 7/2001 | Blackburn |
| 6,625,921 B2 | 9/2003 | Friederichs, III |
| 6,766,610 B1 | 7/2004 | Lin |
| 8,607,499 B2 | 12/2013 | Hoover |
| 2005/0155274 A1* | 7/2005 | Chapel ................... A01K 97/06 43/54.1 |
| 2012/0023807 A1* | 2/2012 | Schoenike ............. A01K 91/16 43/44.91 |

FOREIGN PATENT DOCUMENTS

CA            2796106         5/2014

* cited by examiner

*Primary Examiner* — Jessica B Wong
(74) *Attorney, Agent, or Firm* — Margaret Millikin; Millikin McKay PLLC

(57) ABSTRACT

A fishing accessory in the form of a straight and rigid hollow tubular sheath for containing and storing a fully assembled umbrella fishing rig. The majority of the length of the sheath is straight and is provided with a first open tapered end and a second open flared end. A curved slit extends between the two ends and communicates with a hollow interior of the sheath. A user draws the fishing rig into the sheath by pulling the fishing line which is attached to the head of the umbrella rig through the slit from the flared end to the tapered end. Outwardly biased arms of the rig collapse as they are drawn into the sheath, and the hooks of the rig are stored extended over a flared lip at the flared end of the sheath. The outwardly biased arms hold the rig within the sheath.

13 Claims, 1 Drawing Sheet

FISHING LURE CONTAINMENT AND STORAGE APPARATUS

CROSS-REFERENCE TO RELATED APPLICATIONS

The present application claims priority to U.S. Utility patent application Ser. No. 14/877,120 for Fishing Lure Containment and Storage Apparatus which was filed on Oct. 7, 2015 which in turn claims priority to U.S. Provisional Patent Application No. 62/178,911 for Umbrella Rig Fishing Lure Containment and Storage Apparatus which was filed on Apr. 22, 2015.

BACKGROUND OF THE INVENTION

1. Field of the Invention

The present invention is a fishing accessory for storing a multi-hook fishing lure rig assembly, such as for example an umbrella rig, to prevent the lures from becoming tangled and to allow for quick and easy changing of rigs without the normal detangling of the umbrella rigs from one another.

2. Description of the Related Art

One type of commonly used fishing lure assembly is known as an umbrella rig. Once assembled with a fisherman's chosen hooks and lures, the umbrella rig is extremely difficult to contain. These umbrella rig assemblies, such as the one illustrated in FIG. 2, have outwardly biased arms that cause the attached lures and associated hooks to move outward under normal use. This outwardly biased effect, causes the hooks to become entangled in anything around them, such as carpet, nets, other lures, fishing line, poles, clothing, etc. This type of assembly is easily snagged on things and tends to get tangled easily, particularly when it is either being put into or taken out of service or being when being stored.

The present invention addresses this problem by providing a fishing accessory in the form of a hollow tubular apparatus for containing and storing these types of outwardly biased umbrella rig assemblies.

The invention is a hollow tube approximately 7 inches in length and approximately 1.6 inches in diameter and has two open ends so that a main body of the tube is open from one end to the other. The first of the two open ends is tapered to a smaller diameter than the main body of the tube and the second of the two open ends is flared to a larger diameter than the main body of the tube.

The tube is provided with a slit that extends continuously from one end of the tube to the other and the slit communicates with a hollow interior of the main body of the apparatus.

SUMMARY OF THE INVENTION

The present invention is a fishing accessory in the form of a hollow tubular sheath for containing and storing a fully assembled umbrella type fishing rig. The sheath is a hollow tube approximately 7 inches in length and approximately 1.6 inches in diameter and has two open ends so that a hollow main body of the sheath is open continuously between the two ends. The first of the two open ends is tapered to a smaller diameter than the main body of the sheath, and the second of the two open ends is flared to a larger diameter than the main body of the sheath.

The sheath is provided with a slit that extends continuously from one end of the sheath to the other, and the slit communicates with a hollow interior of the main body of the apparatus.

To insert a fishing rig assembly into the sheath, a user draws the fishing rig through the larger open end of the sheath to the smaller open end by pulling the fishing line which is attached to the head of the umbrella rig through the slit from the larger end to the smaller end of the sheath. As the rig is drawn into the sheath, the flared end of the sheath causes the arms of the rig to collapse into a smaller diameter bringing all of the hooks together at the large end of the sheath where they then can be extended over the flared lip of the larger end of the sheath to hold them in place. The outward pushing force of the biased arms holds the rig within the sheath.

To release the fishing rig assembly from the sheath, the line is pulled through the slit from the small end to the large end of the sheath, thereby pulling the fishing rig to back out of the sheath. As the fishing rig exits the flared end of the sheath, the arms of the rig are again free to move outward to their original expanded configuration.

DETAILED DESCRIPTION OF THE PREFERRED EMBODIMENT

Figure 1:
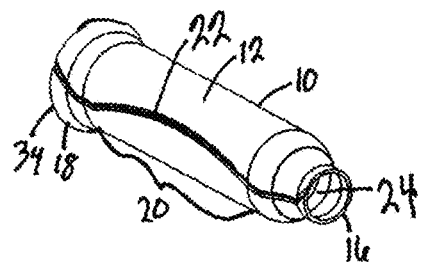
FIG. 1 is a fishing lure containment and storage apparatus that is constructed in accordance with a preferred embodiment of the present invention.

Referring now to the drawing and initially to FIG. 1, there is illustrated a fishing lure containment and storage apparatus 10 that is constructed in accordance with a preferred embodiment of the present invention. This apparatus 10 is in the form of a straight, rigid and hollow tubular sheath 12 for containing and storing a fully assembled umbrella type fishing rig 14.

The sheath 12 is a hollow tube preferably approximately 7 inches in length but is within 5 to 8 inches in length. The sheath 12 is preferably approximately 1.6 inches in diameter but is within 1 to 2 inches in diameter. The sheath 12 and has two open ends 16 and 18 so that a hollow main body 20 of the sheath 12 is open continuously between the two ends 16 and 18. The first of the two open ends 16 is inwardly tapered to a smaller diameter than a diameter of the main body 20 of the sheath 12, and the second of the two open ends 18 is flared to a larger diameter than the diameter of the main body 20 of the sheath 12.

The sheath 12 is provided with a slit 22 that extends continuously from the tapered first end 16 to the flared second end 18. The slit 22 communicates with a hollow interior 24 of the main body 20 of the apparatus 10. The slit 22 is not straight, but is curved.

Figure 2:
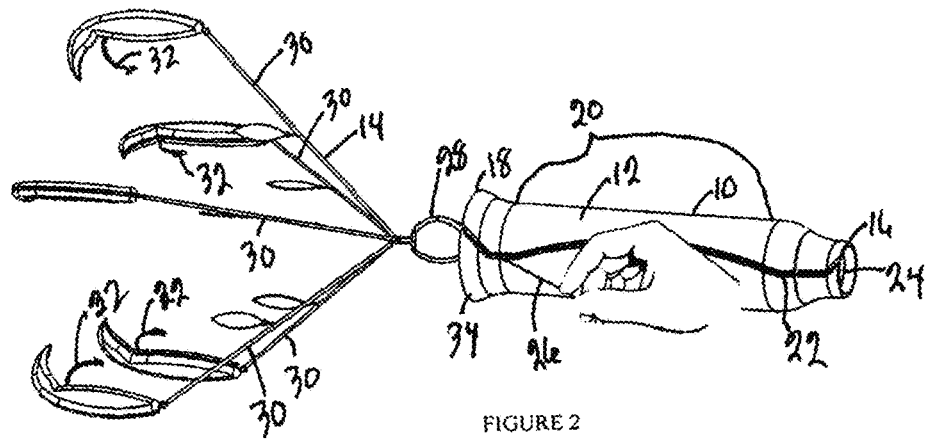
FIG. 2 is the apparatus of FIG. 1 shown with an umbrella rig beginning to be inserted into it.
Figure 3:
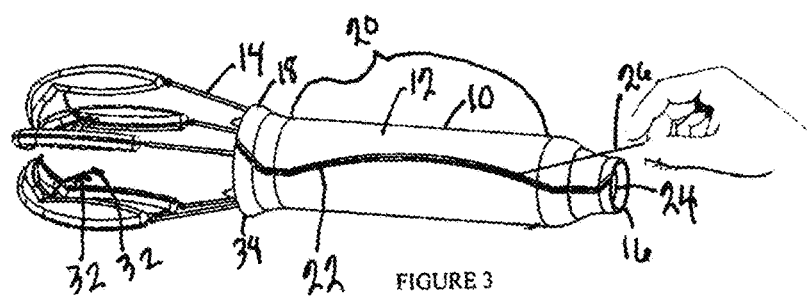
FIG. 3 is the apparatus of FIG. 2 shown with the umbrella rig partially inserted into it.
Figure 4:
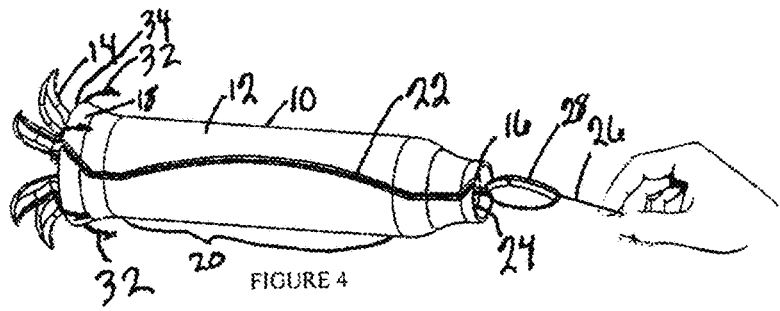
FIG. 4 is the apparatus of FIG. 3 shown with the umbrella rig fully inserted into it.

Referring now to FIGS. 2-4, use of the apparatus 10 is illustrated. Initially a fishing harness or rig 14 is in its fully expanded configuration, as shown in FIG. 2. To insert the fishing rig 14 into the sheath 12, a user draws the fishing rig 14 through the larger flared open end 18 of the sheath 12 and then pulls it to the smaller tapered open end 16 by pulling a fishing wire or line 26 which is attached to a head 28 of the umbrella rig 14 through the slit 22 from the larger end 18 to the smaller end 16 of the sheath 12.

As the rig 14 is drawn into the sheath 12, the flared end 18 of the sheath 12 causes outwardly biased arms 30 of the rig 14 to collapse inward toward each other into a smaller diameter, as shown in FIG. 3. This brings all of the attached hooks 32 together at the large end 18 of the sheath 12 where they then can be extended over a flared lip 34 of the larger end 18 of the sheath 12 to hold them in place, as shown in FIG. 4. The outward pushing force of the biased arms 30 holds the rig 14 within the sheath 12.

To release the fishing rig 14 from the sheath 12, the fishing line 26 is pulled back through the slit 22 from the small end 16 to the large end 18 of the sheath 12, thereby pulling the fishing rig 14 back out of the sheath 12. As the fishing rig 14 exits the flared end 18 of the sheath 12, the arms 30 of the rig 14 are free to move outward to their original expanded configuration.

Several features of the apparatus 10 are important to its function. First, the main body 20 needs to be a straight, rigid tube or tubular sheath and it needs to compose the majority of the length of the apparatus 10, as illustrated in the drawings. The straight, rigid main body 20 allows the wires or arms 30 of the umbrella type fishing rig 14 to be compressed or pushed together and allows them to remain compressed as the rig 14 enters the apparatus 10 from the second end 18 and as the rig 14 is pulled into the hollow interior 24 of the main body 20.

Also, the second open end 18 is provided with a flared lip 34 that allows the arms 30 of the rig 14 to smoothly compress as the rig 14 is pulled into the main body 20 of the apparatus 10 by the fishing line 26, as illustrated in FIG. 3.

Additionally, once within the hollow interior 24 of the main body 20, it is important that the slit 22 that allows the flexible fishing line 26 to be pulled to the first end 16 is not straight, but the slit 22 is instead curved. The curvature of the slit 22 prevents the arms 30 from protrude out of the main body 20 via the slit 22. A straight slit would allow the arms 30 to escape from the main body 20 via the slit. The curved slit 22 insures that the arms 30 remain within the hollow interior 24 for storage of the rig 14 within the sheath 12.

The first open end 16 is tapered and smaller in diameter to prevent the rig 14 from accidentally being pulled out of the main body 20 through that end. The slit 22 terminates at the first end 16 with a 45 degree orientation in order to trap and hold the harness wire or fishing line 26 of the fishing rig 14. The curvature of the slit 22 is best illustrated in FIGS. 3 and 4.

Finally, the second end 18 of the apparatus 10 is larger and flared to allow the leading end of the harness or umbrella type fishing rig 14 to protrude, as shown in FIG. 4, where the hooks 32 are captured at the rim of the second end 18 when the rig 14 is fully inserted into the apparatus 10 for storage.

Although the invention has been described for use with an umbrella rig, it is to be understood that the invention is not limited to this usage.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

We claim:
1. A fishing lure containment and storage apparatus for an umbrella rig, the apparatus comprising:
   a straight and rigid tubular main body having two open ends, a first of the two open ends being inwardly tapered, a second of the two open ends being outwardly flared, said apparatus having a hollow interior that is continuous between the two open ends; and
   a curved slit extending continuously between the two open ends and communicating with the hollow interior;
   wherein the second of the two open ends (18) terminates in a flared lip (34) that is configured to compress the umbrella rig as it is pulled into the main body.
2. An apparatus according to claim 1 wherein:
   the main body has a diameter; and
   the second of the two open ends has a diameter that is larger than the diameter of the main body.
3. An apparatus according to claim 1 wherein:
   the main body has a diameter; and
   the first of the two open ends has a diameter that is smaller than the diameter of the main body.
4. An apparatus according to claim 1 further comprising:
   the curved slit intersecting with the first open end at an angle of between 40 and 50 degrees.
5. An apparatus according to claim 1 wherein said apparatus is between 5 and 8 inches in length.
6. An apparatus according to claim 1 wherein said apparatus is between 1 and 2 inches in diameter.
7. The apparatus according to claim 1 wherein the curved slit is substantially in the form of a sine curve.
8. A fishing lure containment and storage apparatus for an umbrella rig, the apparatus comprising:
   a straight and rigid tubular main body having two open ends, a first of the two open ends being inwardly tapered, a second of the two open ends being outwardly flared, said apparatus having a hollow interior that is continuous between the two open ends; and
   a curved slit extending continuously between the two open ends and communicating with the hollow interior, the curved slit substantially comprising a sine curve;
   wherein the second of the two open ends (18) terminates in a flared lip (34) that is configured to compress the umbrella rig as it is pulled into the main body.
9. An apparatus according to claim 8 wherein:
   the main body has a diameter; and
   the second of the two open ends has a diameter that is larger that the diameter of the main body.
10. An apparatus according to claim 8 wherein:
    the main body has a diameter; and
    the first of the two open ends has a diameter that is smaller than the diameter of the main body.
11. An apparatus according to claim 8 wherein the curved slit intersects with the first open end at an angle of between 40 and 50 degrees.
12. An apparatus according to claim 8 wherein said apparatus is between 5 and 8 inches in length.
13. The apparatus according to claim 8 wherein said apparatus is between 1 and 2 inches in diameter.

\* \* \* \* \*